(No Model.) 2 Sheets—Sheet 1.

J. P. COULTER & T. HIBBERT.
DRAFT AND BUFFING MECHANISM FOR RAILWAY CARS.

No. 432,376. Patented July 15, 1890.

Witnesses:
A. Ruppert
B. Miller

Inventors:
James P. Coulter
Thomas Hibbert
by Howard
attys (No Model.) 2 Sheets—Sheet 2.
J. P. COULTER & T. HIBBERT.
DRAFT AND BUFFING MECHANISM FOR RAILWAY CARS.
No. 432,376. Patented July 15, 1890.
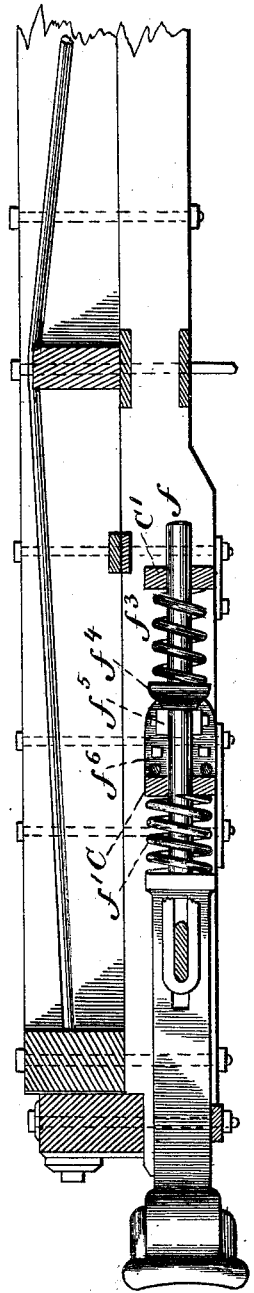
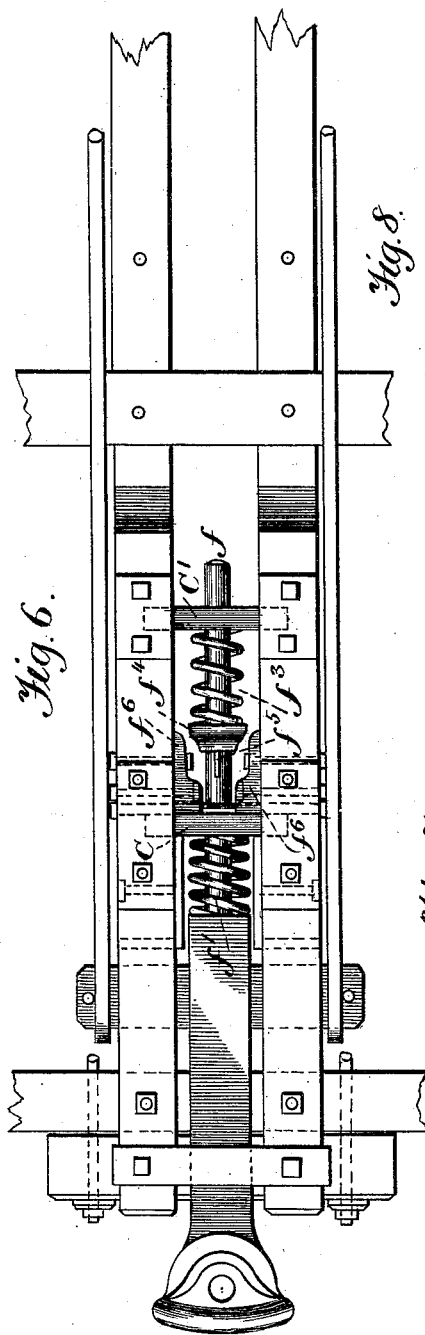
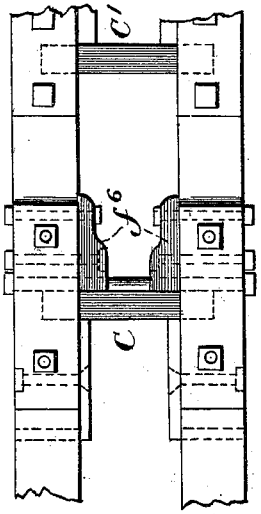
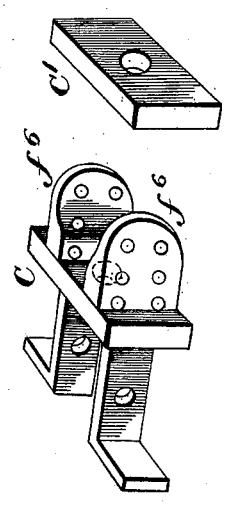
Witnesses:
A. Ruppert
B. Miller
Inventors.
James P. Coulter,
Thomas Hibbert,
by Geo. W. T. Howard atty.
THE NORRIS PETERS CO., PHOTO-LITHO., WASHINGTON, D. C.

UNITED STATES PATENT OFFICE.

JAMES P. COULTER, OF AURORA, AND THOMAS HIBBERT, OF COCHRAN, INDIANA.

DRAFT AND BUFFING MECHANISM FOR RAILWAY-CARS.

SPECIFICATION forming part of Letters Patent No. 432,376, dated July 15, 1890.

Application filed January 6, 1890. Serial No. 336,019. (No model.)

*To all whom it may concern:*

Be it known that we, JAMES P. COULTER and THOMAS HIBBERT, citizens of the United States, residing at Aurora and Cochran, respectively, in the county of Dearborn and State of Indiana, have invented certain new and useful Improvements in Draft and Buffing Mechanism for Railway-Cars, of which the following is a specification, reference being had therein to the accompanying drawings.

Our invention relates to an improvement upon the invention described in Letters Patent No. 251,414, granted December 27, 1881, to James P. Coulter and Thomas Hibbert, and the object of the present improvement is to add to the efficiency of the said invention.

Figure 1:
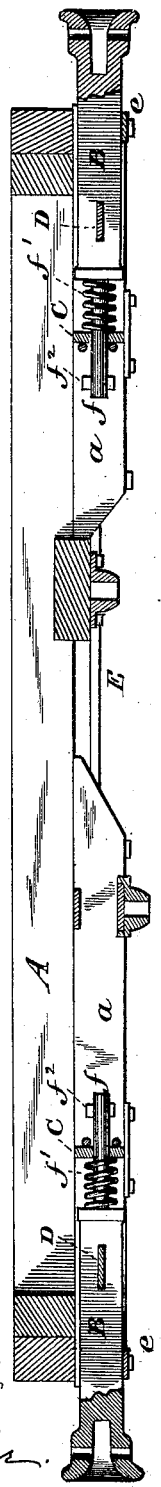
Figure 2:
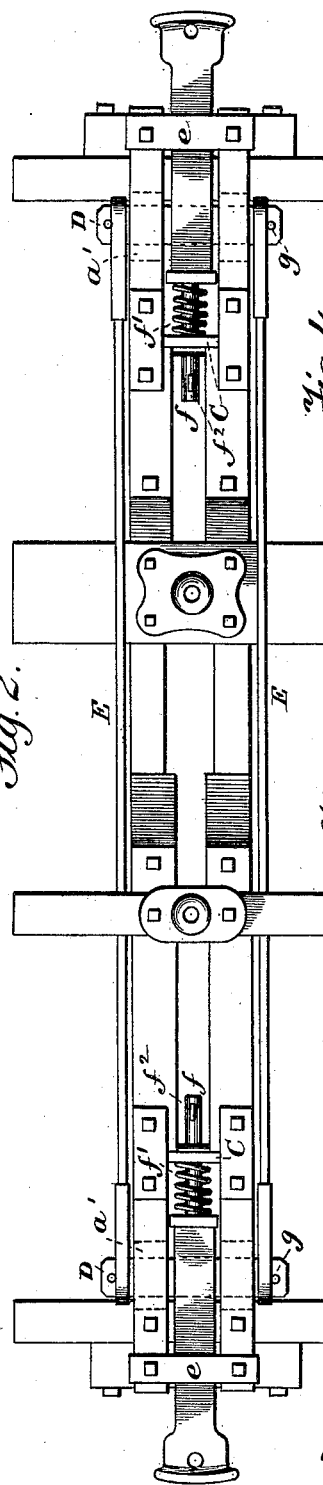
Figure 4:
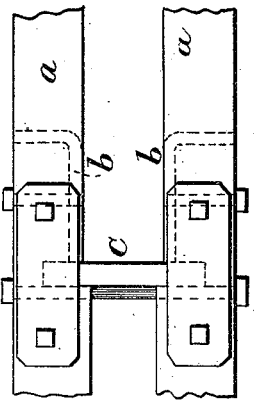
Figure 3:
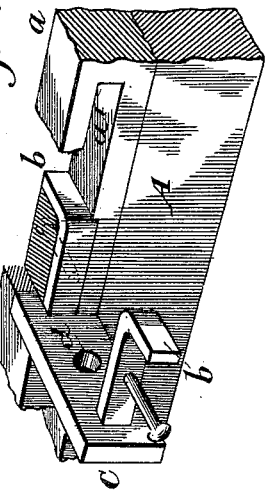

In the accompanying drawings, Figure 1 is a sectional elevation of the lower part of a car-truck embodying the invention described in said Letters Patent No. 251,414. Fig. 2 is an inverted plan of Fig. 1. Figs. 3 and 4 are enlarged details, as also found in the patented invention. Fig. 5 is a sectional elevation of the lower part of a car-truck embodying the present improvement. Fig. 6 is an inverted plan of the same. Figs. 7 and 8 are enlarged details embodying the matter of Figs. 3 and 4, but with our present improvement added. Similar letters of reference indicate similar parts in the respective figures.

Referring to Figs. 1 to 4, inclusive, we will describe certain features shown in the patent and incorporated in the construction to which the present improvement is applied.

A A are longitudinal sills of the car-frame. Secured underneath these sills are beams $a$, which serve as supports or ways for the yielding bumpers or draw-heads B. The beams $a$ are transversely slotted at $a'$ $a'$. Placed at the rear end of each of the slots $a'$ $a'$ is the transverse member of an angle-iron $b$, the longitudinal member of which is secured to the inner surface of its beam $a$. The arrangement of the angle-irons $b$ $b$ with reference to the frame-work is shown in perspective in Fig. 3.

A transverse plate C is placed at the rear of the longitudinal members of the angle-irons $b$ and is perforated or provided with a central opening $d$.

Fig. 4 is a view of a portion of the under side of the beams $a$ $a$, with the transverse plate C, angle-irons $b$ $b$, and strap-irons which confine the plate C to the beams. The yielding draw-head B is placed between the beams $a$ $a$, the sides of the rear part of the draw-head being in contact with the longitudinal members of the respective angle-irons $b$ $b$.

The beams $a$ $a$ are tied together by an iron strap $e$, which serves as a lower support for the draw-head. The rear end of the draw-head consists of a pin or cylindrical portion $f$, which passes through the perforation $d$ of the transverse plate C. A spiral spring $f'$ surrounds the pin $f$, being inserted between the square end of the draw-head and the transverse plate C. The end of the pin $f$ is provided with a pin or key $f^2$. The rear part of the square portion of the draw-head is transversely slotted and receives a plate D, which passes also through the slotted beams $a$ $a$. The ends of the transverse plate D extend beyond the outer surfaces of the beams $a$ $a$ and receive the looped or elongated slotted ends of the draw-bars E, which ends are retained in place by means of keys or pins $g$, passing through the transverse plate D.

The arrangement at each end of the car is the same, and it will be seen that when compression is exerted upon one of the draw-bars its transverse plate D is forced against the transverse members of the angle-irons $b$ $b$ at that end of the car, which serve as stops or abutments, the plate sliding in the looped ends of the draw-bars, thus relieving the bars from the compression. The act of bumping independently compresses or forces in both the draw-heads, bringing the transverse plate of each in contact with the angle-irons of its end of the car, the draw-bars being prevented from receiving compressive strain, as before stated. A tractive strain being placed upon either draw-head will be transferred, through the medium of the transverse plate and the draw-bars, to the opposite end of the car, where it will be received by the transverse members of the angle-irons $b$ $b$ at that end of the car.

In the present invention (seen in Figs. 5, 6, 7, and 8, and now specially referred to) we have added another spring $f^3$, corresponding in a measure to that $f'$ of the patent, and have lengthened the cylindrical rear end $f$ of the draw-head, so as to pass through said additional spring $f^3$ and a second transverse plate C'. Upon the cylindrical rear end $f$ of the draw-head we place a washer $f^4$, between which and the plate C' the additional spring $f^3$ is confined. The cylindrical rear end $f$ is slotted, and in the slot is placed a key $f^5$, against which the rear side of the washer $f^4$ rests. Instead of the washer and key a shoulder forming a part of the end $f$ may be employed. As a means of additionally securing the transverse plate C, we use angle-irons $f^6$, which are bolted to the sills, as shown. The transverse plate C' may also be firmly secured by angle-irons or otherwise. This construction greatly increases the power and utility of the single spring shown in Patent No. 251,414. We prefer to use a spring nearest the end of the car, as that $f'$, that will require about fifteen thousand pounds pressure, while the rear spring, as that $f^3$, will require about nine thousand pounds, thereby increasing the resisting power above that provided for in the patent about eighteen thousand pounds.

Having described our invention, we claim—

1. The combination of the longitudinal sills or beams of a railroad-car transversely slotted, as described, a yielding draw-head provided with a transverse slot and a cylindrical rear end, a bar passing through said slot and the slotted longitudinal sills or beams, transverse plates secured to the longitudinal sills or beams, a spring surrounding the cylindrical rear end of the draw-head and confined between the front or larger part of the draw-head and one of said transverse plates, and a second spring also surrounding the cylindrical rear end of the draw-head and confined between a fixed part of said cylindrical rear end and the second transverse plate, substantially as set forth.

2. The longitudinal sills or beams of a railroad-car transversely slotted, as described, a yielding draw-head having a transverse bar extending at each side beyond its outer limits and through the slotted sills, draw-bars each having an elongated slot adapted to fit over an end of the transverse bar, combined with transverse plates, and springs surrounding the draw-head and confined independently of each other between shoulders on the draw-head and the said transverse plates, substantially as set forth.

In testimony whereof we hereunto set our hands and seals.

JAMES P. COULTER. [L. S.]
THOMAS HIBBERT. [L. S.]

Witnesses:
JOHN A. PORKS,
DAVID H. STAFF.